United States Patent [19]

Böhnensieker

[11] Patent Number: 4,682,712
[45] Date of Patent: Jul. 28, 1987

[54] DEVICES FOR THE PREPARATION OF A MIXTURE FROM AT LEAST TWO FLUIDS WITH A DEFINITE MIXTURE RATIO

[76] Inventor: Franz Böhnensieker, Vom Stein-Strasse 27, D-4734 Harsewinkel, Fed. Rep. of Germany

[21] Appl. No.: 678,586

[22] Filed: Dec. 5, 1984

[30] Foreign Application Priority Data

Dec. 5, 1983 [DE] Fed. Rep. of Germany ....... 3343935

[51] Int. Cl.⁴ ............................................. B67D 5/52
[52] U.S. Cl. .................................... 222/137; 222/249; 137/98; 417/397
[58] Field of Search ............... 222/249, 250, 132, 134, 222/137, 409, 275, 276, 282, 129 R; 417/397, 393; 366/162, 150; 137/98, 99

[56] References Cited

U.S. PATENT DOCUMENTS

| | | | |
|---|---|---|---|
| 1,929,719 | 10/1933 | Werder | 222/249 |
| 2,533,281 | 12/1950 | Oliveau | 222/249 |
| 2,736,466 | 2/1956 | Rodth | 222/137 |
| 2,894,732 | 7/1959 | Taber et al. | 259/4 |
| 2,912,994 | 11/1959 | Mori | 137/98 |
| 3,322,305 | 5/1967 | Tremolada | 222/137 |
| 3,345,997 | 10/1967 | Miller et al. | 137/99 |
| 3,744,764 | 7/1973 | Sedam | 259/44 |
| 3,901,408 | 8/1975 | Boden et al. | 222/134 |
| 4,132,483 | 1/1979 | Slaats et al. | 366/162 |
| 4,538,919 | 9/1985 | Bohnensieker | 366/162 |

FOREIGN PATENT DOCUMENTS 1503648  4/1974  United Kingdom ............... 417/397

Primary Examiner—Joseph J. Rolla
Assistant Examiner—Kenneth Noland
Attorney, Agent, or Firm—Birch, Stewart, Kolasch & Birch

[57] ABSTRACT

A device for the preparation of a mixture of a basic fluid and at least one additional fluid in a definite mixing ratio is described. The device has a main piston which is movable in a master cylinder between two limit positions. A control unit can feed basic fluid under pressure alternately to one side of the piston and to the other. The main piston is connected to at least one metering piston which is movable in a metering cylinder having an inlet for an additional fluid and an outlet connected to the mixing vessel. In operation, movement of the main piston in the direction which increases the volume of the metering chamber formed in the metering cylinder causes additional fluid to be fed to the metering chamber through its inlet, while movement of the main piston in the opposite direction causes additional fluid in the metering chamber to be expelled through the metering cylinder outlet into the mixing vessel.

7 Claims, 2 Drawing Figures

DEVICES FOR THE PREPARATION OF A MIXTURE FROM AT LEAST TWO FLUIDS WITH A DEFINITE MIXTURE RATIO

CROSS-REFERENCE TO RELATED APPLICATIONS

This application is related to U.S. Pat. No. 4,538,919, issued Sept. 3, 1985 to the present inventor.

BACKGROUND OF THE INVENTION

The invention relates to a device for the preparation of a mixture from at least two fluids with a definite mixture ratio, using a basic fluid and at least one additional fluid. In particular, the invention relates to a device for the preparation of wiping fluid for printing machines with water as the basic fluid and at least one additional concentrate.

A device of the type in question is known from the German patent specification No. 14 57 277, where a float is provided in a mixing vessel which turns the intake of basic fluid on as soon as the fluid level in the mixing vessel falls below a specified mimimum value and off as soon as the fluid level in the mixing vessel reaches a specified maximum value. A measuring vessel for a chemical additive is designed as a float and located in the mixing vessel below an outlet opening. Installed in the intake pipe for the basic fluid is a jet pump whose suction branch reaches into the measuring vessel when the latter has floated to a certain height.

When such a device has to be constructed for the mixing of more than two fluids, it involves the provision of electrical devices which control the intake of individual fluids into the mixing vessel.

SUMMARY OF THE INVENTION

Compared with this it is one of the objects of this invention to create a device of the type in question which facilitates the preparation of a mixture from two or more fluids with a high degree of accuracy as regards the mixture ratio whilst keeping the technical expenditure as low as possible.

Another object of the invention is the creation of a device of the type in question which facilitates the preparation of a mixture from two or more fluids with a high degree of accuracy coupled with low technical expenditure and a simple and, in terms of production engineering, easy to realise adjustment of the volume of the metering chamber(s) for the additional fluid(s).

According to one aspect the device of the invention for the preparation of a mixture with a definite mixture ratio from one basic fluid and at least one additional fluid is characterized by a metering arrangement consisting of a control unit to feed the pressurized basic fluid alternately to one or the other side of a main piston moving in a master cylinder between two limit positions, so that the main piston is moved from one limit position to the other limit position, thereby expelling a definite quantity of basic fluid from the master cylinder into a mixing vessel, and a device to connect the main piston to at least one metering piston which moves in a metering cylinder with an inlet for the additional fluid and outlet that connects with the mixing vessel and which is located between a position where the volume of the metering chamber formed in the metering cylinder is minimal and a position where the volume of the metering chamber formed in the metering cylinder is maximum, all in accordance with the movement of the main piston from one limit position to the other limit position, whereby the movement of the metering piston in the direction increasing the metering chamber causes the additional fluid to be fed into the latter, whilst movement of the metering piston in the direction reducing the metering chamber causes the additional fluid collected therein to be expelled into the mixing vessel.

According to another aspect the device of the invention for the preparation of a mixture with a definite mixture ratio from a basic fluid and at least one additional fluid is characterized by a metering arrangement consisting of a control unit to feed the pressurized basic fluid alternately to one or the other side of a main piston moving in a master cylinder between two limit positions, so that the main piston is moved from one limit position to the other limit position, thereby expelling a definite quantity of basic fluid from the master cylinder into a mixing vessel, and a connecting device to connect the main piston to at least one metering piston which moves in a metering cylinder with an inlet for the additional fluid and an outlet that connects with the mixing vessel and which is located between a position where the volume of the metering chamber formed in the metering cylinder is minimal and a position where the volume of the metering chamber formed in the metering cylinder is maximum, all in accordance with the movement of the main piston from one limit position to the other limit position, whereby the movement of the metering piston in the direction increasing the metering chamber causes the additional fluid to be fed into the latter, whilst movement of the metering piston in the direction reducing the metering chamber causes the additional fluid collected therein to be expelled into the mixing vessel, and where the metering piston is arranged to slide axially between two adjustable limit positions on the connecting device in order to set the volume of the metering chamber.

BRIEF DESCRIPTION OF THE DRAWINGS

The invention is explained below in greater detail by way of exemplary constructions and the drawings where.

DETAILED DESCRIPTION OF THE INVENTION

Figure 1:
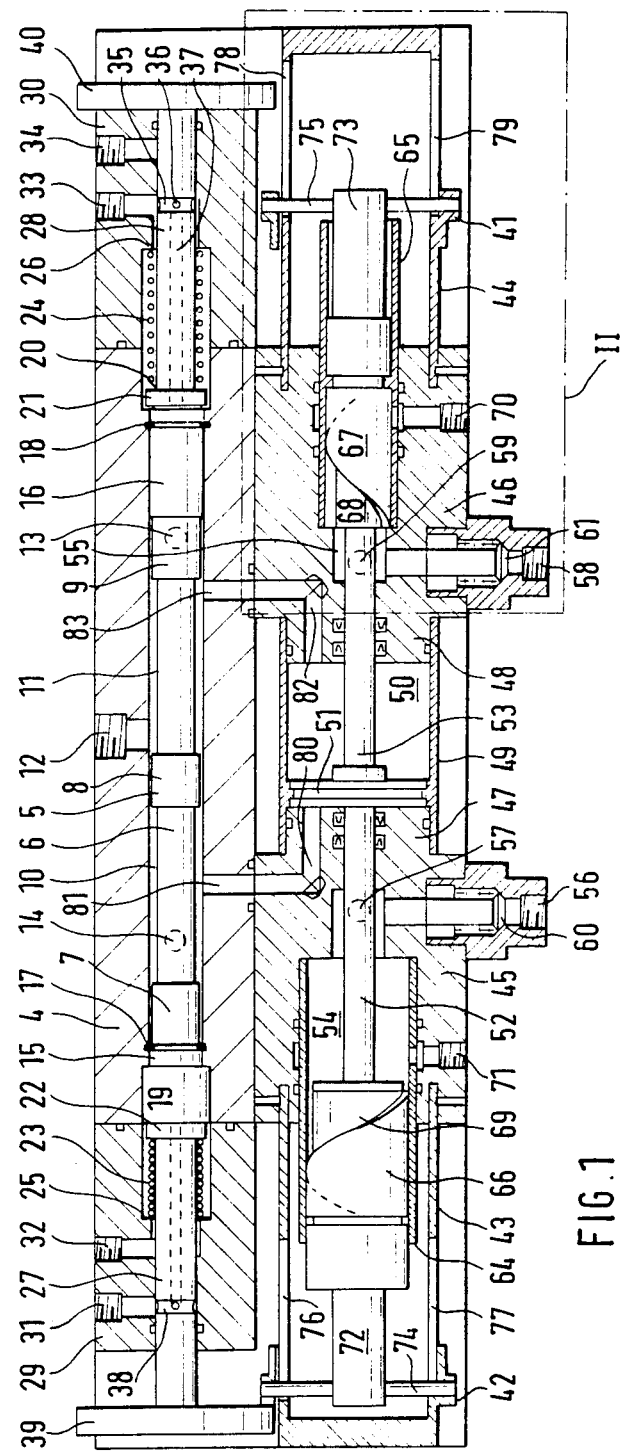
FIG. 1 shows a sectional view of a first example of a device in accordance with the invention, is similar to FIG. 1 in the aforementioned U.S. Pat. No. 4,538,919 to Bohnensieker

The metering arrangement comprises a control valve 5 which slides in a casing 4 and which carries three pistons 7, 8, 9 arranged at a distance from each other and which, between them, define cylindrical chambers 10 and 11 in conjunction with a cylinder bore incorporated into the casing 4. Depending on the position of the control valve 5, the cylindrical chamber 10 formed between pistons 7 and 8 or the cylindrical chamber 11 formed between pistons 9 and 8 is connected with an inlet opening or port 12. Connected to the opening 12 is a supply line—not shown—for a pressurized basic fluid, such as water or similar.

When the control valve 5 is in the position shown, an opening 13 in casing 4 which is connected to a mixing vessel—not shown—is closed by the piston 9, whilst an opening 14 in casing 4 which is also connected with the mixing vessel is released by piston 9 and connected with the cylindrical chamber 10. The stroke of the control valve 5 is limited by two stop elements 17 and 18 which are arranged in bores 15 and 16 at opposite ends of the control valve. The bores 15 and 16 are followed by cylinders 19 and 20 into which reach spring-loaded piston rods 27 and 28.

The piston rods 27 and 28 are held in flanged casings 29 and 30 which are arranged on opposite sides of casing 4 and which are firmly attached to the casing 4 in a manner not shown.

The casings 29 and 30 feature two through holes each 31, 32 and 33, 34 resp, of which bores 32 and 33 are connected to a return line—not shown—and bores 31 and 34 to a supply line—not shown—for a pressure medium, e.g. water. With the control valve 5 in the position shown in FIG. 1, the piston rod 28 seals the bore 34 whilst the bore 33 is connected with bore 16 through a ring groove 35 in the piston rod, as well as radial and axial bores 36, 37.

The bore 32 on the opposite side of the control valve 5 is sealed by the piston rod 27, whilst the bore 31 which feeds the pressure medium is aligned with a ring groove 38 in the piston rod 27, so that the pressure medium can enter the chamber or the bore 15 through the ring groove and the radial and axial bores in the piston rod 27 in order to pressure-load the control valve 5.

Connected to casing 4 are casings 45 and 46 arranged at an axial distance from each other and whose facing ends feature diametrically reduced studs 47, 48 which are connected by a tube 49. This tube 49 between studs 47 and 48 forms a cylinder 50 in which moves a reciprocating main piston 51. From both sides of the main piston 51 there extend piston rods 52 and 53 into the associated metering cylinders 54, 55 in casings 45 and 46.

Bores 80, 81 connect the cylinder 50 with the cylindrical chamber 10 between pistons 7 and 8 of the control valve 5 whilst bores 82, 83 connect it with the cylindrical chamber 11 between pistons 8 and 9 of the control valve 5. The bores 80, 82 leading into the cylinder 50 are separated from each other by the main piston 51. The operating method of the metering system is as follows:

When the pressure medium bears through bore 31 onto the piston 7 of the control valve 5, the control valve 5 moves to the right in FIG. 1 because the chamber 16 in front of the piston 9 is, at the same time, connected with the return line through bores 37, 36, 35 and 33.

The control valve 5 stops moving to the right when the piston 9 touches the stop 18 in the bore or in chamber 16. During the control valve's movement to the right the piston 7 seals the bore 14 leading to the mixing vessel and the inlet port 12 for the basic fluid is connected with the cylindrical chamber 10 whilst the previous connection between the inlet port 12 and the cylindrical chamber 11 is disrupted. Instead, the bore 13, which is also connected with the mixing vessel, is released and connected with the bores 82 and 83 through the cylindrical chamber 11.

The pressurized basic fluid available at the inlet port 12 flows via the cylindrical chamber 10 and the bores 80 and 81 into the cylinder 50, thereby causing the main piston 51 to move to the right. In so doing the quantity of basic fluid in the cylinder 50 in front of the main piston 51 is expelled into the mixing vessel—not show-n—through the bores 82 and 83, the cylindrical chamber 11 and the bore 13.

As the main piston 51 moves to the right a metering piston 67 arranged on the piston rod 53 is also moved to the right, thereby drawing through bore 58 in casing 46 which is connected to a source of fluid, a defined quantity of additional fluid to be added to the basic fluid, e.g. a concentrate, into the cylindrical or metering chamber 55. A bore 59 connected to the metering chamber 55 is also connected with the mixing vessel, but blocked off during the intake phase of the metering piston 67 by a return valve.

Analogously with piston 67 the metering piston 66 arranged on the other side of the main piston 51 on piston rod 52 moves also to the right, thereby expelling the fluid collected in the metering cylinder 54 during a previous intake phase through the bore 57 into the mixing vessel—not shown—whilst the bore 56 connected with the source of fluid is blocked by a return valve.

This means that with each stroke of the main piston 51 from one limit position close to bore 80 or 82 to the other limit position close to bore 82 or 80 fluid is drawn into one of the metering chambers 55 or 54 and expelled from the other metering chamber 54 or 55 and fed to the mixing vessel together with the quantity of basic fluid that has been displaced from cylinder 50 by the main piston 51.

To facilitate adjustment of the volume of the metering chambers 54 and 55 and thus the quantity of additional fluid fed to the mixing vessel, the metering pistons 66 and 67 of the embodiment shown in FIG. 1 are arranged to rotate on the piston rods 52 and 53, as well as featuring helical control edges 68, 69 which, depending on the rotary position of the metering pistons, will sooner or later in the movement of the metering piston close the outlet bores 70, 71, which may be fitted with return valves, thereby limiting the maximum amount of fluid delivered. Adjustment of the delivered quantity is similar, therefore, to the method deployed in the injection pumps of automotive fuel injection systems, so that there is no need to go into this in greater detail.

Figure 2:
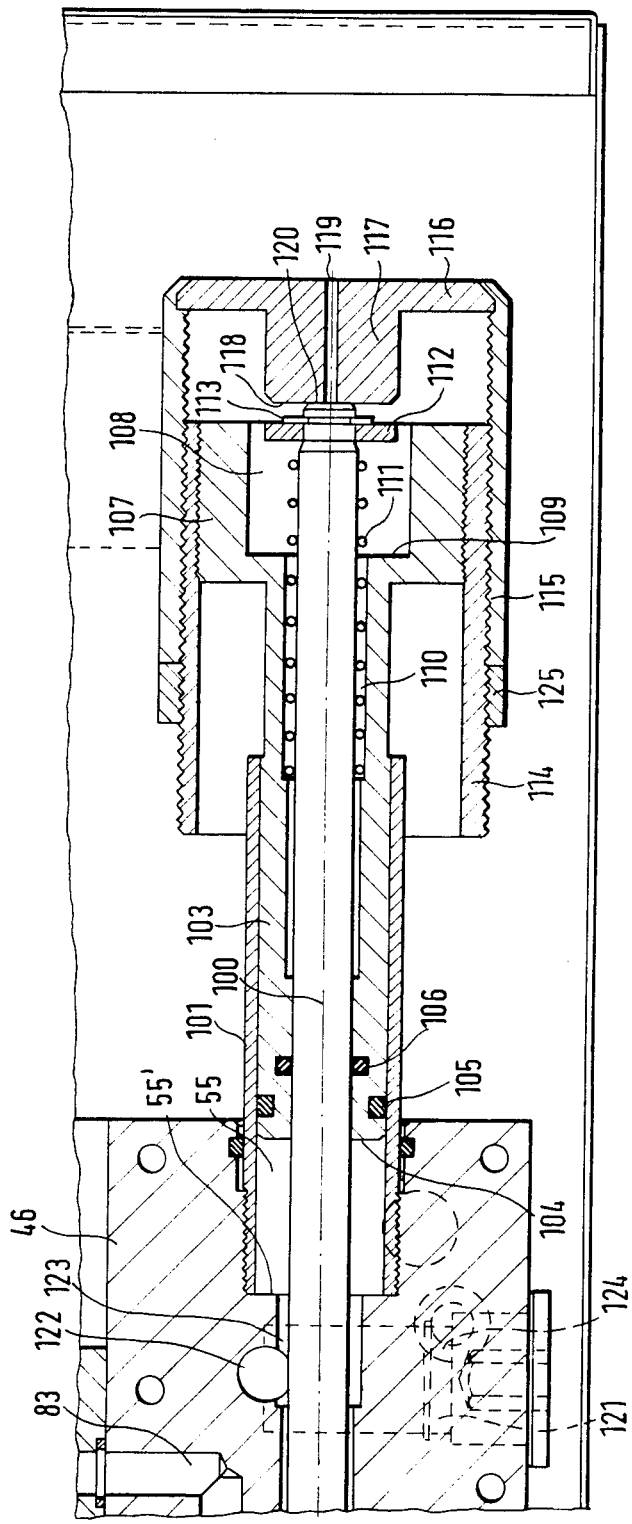
FIG. 2 shows a fragmentary section of a currently preferred second embodiment of the invention.

Below is a description of a preferred version of the invention as shown in FIG. 2 which differs from the embodiment in FIG. 1 basically through the metering arrangement for the additional fluid to be added to the basic fluid and indicated in FIG. 1 by means of a dotted outline. Since the arrangements on the left and right of the main piston 51 are basically identical, only the arrangement identified on the right of FIG. 1 by means of a dotted outline, is detailed below with the help of FIG. 2. Identical or similar parts shown in FIG. 2 carry the same reference numbers as in FIG. 1.

The preferred version of the metering system to FIG. 2 comprises, as shown, a metering chamber 55 formed in a cylinder 101, mounted in the casing 46, between the face 104 of a metering piston 103 and the cylinder end wall 55'. The metering piston 103 reciprocates axially in the cylinder and is arranged to slide axially on a piston rod 100 connected to the main piston 51.

The metering piston 103 is sealed against the cylinder 101 and the piston rod 100 by means of O-rings 105 and 106 for example, which are located in suitable grooves in the metering piston 103.

The piston rod 100 extends axially through the metering piston 103 and carries close to its free end 120 protruding from the metering piston 103 a supporting element 112 against which rests, as illustrated, one end of acoil spring 111 surrounding the piston rod and whose other end presses against a shoulder formed at an intermediate point inside the metering piston 103. In the arrangement shown in FIG. 2 the spring 111 is, therefore, pushing the metering piston 103 to the left or in the direction of the end wall 55' of the metering chamber 55 whenever the metering piston 103 is in contact with the end wall 55' and the piston rod 100 has moved further to the left.

The end of the metering piston 103 which protrudes from the rear of the cylinder 101 features a sleeve-like diametrical enlargement 107 forming a recess 108 with a bottom 109. A male-threaded sleeve 114 is attached to the outer circumference of the sleeve-like enlargement 107. An adjusting sleeve 115 with female thread is screwed onto the sleeve 114.

The adjusting sleeve 115 is sealed at one end with an end wall 116 which carries a projection 117 that is aligned with the piston rod 100 and with whose face 118 the free end face 120 of the piston rod 100 can make contact. The projection 117 can be interspersed with a ventilating bore 119 as shown.

The axial position of the adjusting sleeve 115 in relation to the threaded sleeve 114 can be altered by turning the adjusting sleeve 115 and is secured with a counter ring 125 which is also screwed onto the threaded sleeve 114. The supporting element 112 is locked on the piston rod 100 by means of a locking ring 113.

The operating method of the device shown in FIG. 2 is as follows. Let us asume that at the start of the metering cycle the metering piston 103 assumes a position in the metering cylinder 101 where the face 104 of the piston rests against the end wall 55', so that the volume of the metering chamber 55 is minimal. The main piston 51 (see FIG. 1) is then in the left limit position shown in FIG. 1. The supporting element 112 against which rests one end of the spring 111 is in contact with the bottom 109 of the recess 108 of piston 103, so that the spring 111 is compressed and basically pushed into the metering piston 103. In addition, the free end face 120 of the piston rod 100 is at a distance from the contact face 118 of the projection 117 which is defined by the axial position of the adjusting sleeve 115 in relation to the threaded sleeve 114.

When the main piston 51 moves to the right under the influence of the pressure of the basic fluid acting on its one side (see FIG. 1), the piston rod 100 is also moved in that direction. Since the metering piston 103 is axially displaceable in relation to the piston rod and pushed against the end wall 55' of the metering chamber 55 by the spring 111, the metering piston 103 does not follow the piston rod's 100 initial movement to the right, but maintains its position in relation to the end wall 55' unaltered. Only the continued movement of the piston rod 100 to the right causes its free end face 120 to come into contact with the stop face 118 at the projection 117 and this leads to the metering piston 103 and the piston rod 100 moving to the right together, thereby steadily increasing the volume of the metering chamber 55 until the main piston 51 reaches its limit position in the cylinder 50. The maximum volume of the metering chamber 55 is thus defined by the limit position of the metering piston 103 and this in turn by the relative position of the adjusting sleeve 115 in relation to the threaded sleeve 114. During the phase when the volume of the metering chamber 55 is increased the fluid is drawn into the metering chamber 55 via a return valve 121 and bores 122, 123.

When the main piston 51 moves subsequently to the left following the reversing of the control valve 5, the piston rod 100 undergoes the same change in direction which transmits to the metering piston 103 due to the end face 120 of the piston rod 100 contacting the projection 117 of the threaded sleeve 115. As a result the metering piston 103 is also moved to the left towards the end wall 55' of the metering chamber 55, thereby expelling the fluid collected in the metering chamber 55 via the bores 122, 123 and a return valve 124 into the mixing vessel—not shown—to be mixed with the basic fluid that has been fed into the mixing vessel from the cylinder 50 via the bores 80 and 81, the cylindrical chamber 10 and the bore 14.

Adjustment of the volume of the metering chamber 55 and thus the quantity of fluid fed into the mixing vessel during each cycle, is by slackening the counter ring 125 on the threaded sleeve 114 and turning the adjusting sleeve 115 in the required direction so that the axial position of the adjusting sleeve 115 is altered in relation to the threaded sleeve 114. This causes the projection 117 shown in FIG. 2 to be moved to the right (reduction in the volume of the metering chamber 55) or to the left (increase in the volume of the metering chamber 55). After the required volume of the metering chamber 55 has been set, the position of the adjusting sleeve 115 in relation to the threaded sleeve 114 is locked once again by means of the counter ring 125.

In the case of the device as per FIG. 2 adjustment of the metering volume is, therefore, achieved by limiting the effective stroke of the piston, which eliminates the need for a helical control edge at the metering piston as in the case of the device to FIG. 1. The device shown in FIG. 2 is, therefore, of simpler design, making it easier to construct in terms of production engineering.

The above description refers to the preferred embodiment of the invention. It is understood, however, that the invention is not restricted to this construction, but modifications which offer themselves to the expert on the basis of the said theory are included in the protective scope of the invention.

I claim:

1. Device for the preparation of a mixture with a definite mixture ratio from a basic fluid and at least one additional fluid, with a metering arrangement consisting of a control unit to feed the pressurized basic fluid alternately to one or the other side of a main piston moving in a master cylinder between two limit positions, so that the main piston is moved from one limit position to the other limit position, thereby expelling a definite quantity of basic fluid from the master cylinder into a mixing vessel, and a connecting device to connect the main piston so at least one metering piston which moves in an associated metering cylinder with an inlet for the additional fluid and an outlet that connects with the mixing vessel and which is located between a position where the volume of the metering chamber formed in the metering cylinder is minimal and a position where the volume of the metering chamber formed in the metering cylinder is maximum, all in accordance with the movement of the main piston from one limit position to the other limit position, whereby movement of the metering piston in the direction increasing the metering chamber causes the additional fluid to be fed into the latter, whilst movement of the metering piston in the direction reducing the metering chamber causes the additional fluid collected therein to be expelled into the mixing vessel, and where the metering piston is arranged to slide axially between two adjustable limit positions on the connecting device in order to set the volume of the metering chamber, and the connecting device comprises a piston rod which extends through the metering piston and which has one free end wherein one of the limit positions is defined by the interaction of a fixed stop element close to the outer end of the piston rod with a first stop face at the metering piston and the other limit position by the interaction of the outer end of the piston rod with a second stop face at the metering piston whose axial position is adjustable in relation to the first stop face.

2. Device for the preparation of a mixture with a definite mixture ratio from a basic fluid and at least one additional fluid, with a metering arrangement consisting of a control unit to feed the pressurized basic fluid alternately to one or the other side of a main piston moving in a master cylinder between two limit positions, so that the main piston is moved from one limit position to the other limit position, thereby expelling a definite quantity of basic fluid from the master cylinder into a mixing vessel, and a connecting device to connect the main piston to at least one metering piston which moves in an associated metering cylinder with an inlet for the additional fluid and an outlet that connects with the mixing vessel and which is located between a position where the volume of the metering chamber formed in the metering cylinder is minimal and a position where the volume of the metering chamber formed in the metering cylinder is maximum, all in accordance with the movement of the main piston from one limit position to the other limit position, whereby movement of the metering piston in the direction increasing the metering chamber causes the additional fluid to be fed into the latter, whilst movement of the metering position in the direction reducing the metering chamber causes the additional fluid collected therein to be expelled into the mixing vessel, and where the metering piston is arranged to slide axially between two adjustable limit positions on the connecting device in order to set the volume of the metering chamber, the connecting device comprises a piston rod which extends through the metering piston and which has one free end and wherein one of the limit positions is defined by the interaction of a fixed stop element close to the outer end of the piston rod with a first stop face at the metering piston and the other limit position by the interaction of the outer end of the piston rod with a second stop face at the metering piston whose axial position is adjustable in relation to the first stop face, and the second stop face is provided at an adjustable sleeve which is axially adjustable in relation to a support sleeve attached to the metering piston.

3. The device of claim 2, including a spring system which extends between the piston rod and the metering piston to preload the metering piston in a direction that reduces the volume of the metering chamber.

4. The device of claim 3, further wherein the spring is a coil spring which extends between the stop element close to the outer end of the piston rod and a shoulder face inside the metering piston.

5. The device of claim 2, wherein the adjustable sleeve is a threaded element that can be screwed onto a male threaded support sleeve attached to the metering piston.

6. The device of claim 5, including a radial enlargement at the metering piston with a recess whose bottom face forms the first stop face and on which the support sleeve is mounted.

7. The device of claim 6, wherein the support sleeve features a projection which forms the second stop face and which engages in the recess at the metering piston.

* * * * *